(12) United States Patent
McVickar et al.

(10) Patent No.: US 8,719,120 B1
(45) Date of Patent: May 6, 2014

(54) POPULATING TAX DATA USING AN EMPLOYER IDENTIFICATION NUMBER

(75) Inventors: Richard E. McVickar, San Diego, CA (US); Azhar M. Zuberi, San Diego, CA (US); Christopher Morgan Dye, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 77 days.

(21) Appl. No.: 13/348,540

(22) Filed: Jan. 11, 2012

(51) Int. Cl.
*G06Q 40/00* (2012.01)

(52) U.S. Cl.
CPC .................................. *G06Q 40/103* (2013.01)
USPC ............................................. 705/31; 705/1.1

(58) Field of Classification Search
CPC ................................................... G06Q 40/103
USPC ................................ 705/32, 1.1, 31
See application file for complete search history.

(56) References Cited

U.S. PATENT DOCUMENTS

| | | | |
|---|---|---|---|
| 6,697,787 B1* | 2/2004 | Miller ............................... | 705/31 |
| 7,747,484 B2* | 6/2010 | Stanley et al. ................... | 705/31 |
| 8,290,941 B2* | 10/2012 | Alexander ...................... | 707/723 |
| 2004/0064330 A1* | 4/2004 | Keelan et al. ....................... | 705/1 |
| 2006/0111990 A1* | 5/2006 | Cohen et al. ..................... | 705/32 |
| 2008/0040779 A1* | 2/2008 | Budzichowski .................. | 726/5 |

OTHER PUBLICATIONS www.irs.gov, "Understanding your EIN", Oct. 24, 2002 (Wayback machine).*
www.answers.com, "Employer Identification Number", Mar. 3, 2007 (Wayback machine), Encyclopedia of Small Business.*
Steven J. Davis, Measuring the Dynamics of Young and small business:intergrating the employer and nonemployer universes, Paper 13226 http://www.nber.org/papers/w13226 National Bureau of Economic Research 1050, Jul. 2007.*
Brenda G. Cox, Business Survery Method, John Wiley and Sons, 1005, pp. 334-375.*
www.irs.gov, W-9 form, revised 2011.*

* cited by examiner

*Primary Examiner* — M. Thein
*Assistant Examiner* — Milena Racic
(74) *Attorney, Agent, or Firm* — Osha Liang LLP (57) ABSTRACT

A method for populating tax forms, including: aggregating a set of employer identification numbers (EINs) in a repository; receiving, from a tax preparation application, a first request for tax data of a first user, where the first request includes a first name of a first employer; matching, by a computer processor, the first name of the first employer to a first EIN of the set of EINs, where the first EIN corresponds to a first government agency; identifying a first payroll provider of the first employer based on the first EIN; importing, by the computer processor, the tax data from the first payroll provider; and populating a first tax form of the first user with the tax data and the first EIN.

34 Claims, 7 Drawing Sheets

POPULATING TAX DATA USING AN EMPLOYER IDENTIFICATION NUMBER

BACKGROUND

Many local, state, and federal government agencies have replaced manual processes with computer and web-based systems. Increased efficiency and a reduction in human error are among the obvious benefits of such systems. Due to the service oriented nature of such agencies, self-service solutions to manual processes have lead to an even more substantial benefit: the wide-spread availability of information.

As an example, government tax agencies are responsible for requesting, receiving, analyzing, and auditing tax payments from a wide range of different taxpayers. Filing income taxes is a difficult endeavor for most taxpayers. As the complexity of the tax code has increased steadily in the past few decades, so too has the difficulty for individuals and businesses in maintaining compliance. This has contributed to the popularity of tax preparation software for electronic preparation and filing of personal income taxes.

Though many taxpayers file their income taxes under the advisement of tax preparation software and/or a tax professional (i.e., a certified public accountant), much of the process is cumbersome. Not only do requirements vary among different government agencies and jurisdictions, but employers and financial institutions also have differing and sometimes incompatible systems and requirements. After aggregating data from these various sources, taxpayers are required to manually enter the data into multiple forms which are then used to file with multiple different agencies.

Furthermore, employers, financial institutions, and other sources of tax data may not provide the necessary information on the same date or even prior to the deadline for tax filing. Thus, tax filings are sometimes delayed while the taxpayer gathers, analyzes, and enters the required data into the form required for submission.

SUMMARY

In general, in one aspect, the invention relates to a method for populating tax forms. The method includes: aggregating a set of employer identification numbers (EINs) in a repository; receiving, from a tax preparation application, a first request for tax data of a first user, wherein the first request includes a first name of a first employer; matching, by a computer processor, the first name of the first employer to a first EIN of the set of EINs, wherein the first EIN corresponds to a first government agency; identifying a first payroll provider of the first employer based on the first EIN; importing, by the computer processor, the tax data from the first payroll provider; and populating a first tax form of the first user with the tax data and the first EIN.

In general, in one aspect, the invention relates to a non-transitory computer-readable storage medium storing instructions for populating tax forms. The instructions include functionality to: aggregate a set of employer identification numbers (EINs) in a repository; receive, from a tax preparation application, a first request for tax data of a first user, wherein the first request includes a first name of a first employer; match the first name of the first employer to a first EIN of the set of EINs, wherein the first EIN corresponds to a first government agency; identify a first payroll provider of the first employer based on the first EIN; import the tax data from the first payroll provider; and populate a first tax form of the first user with the tax data and the first EIN.

In general, in one aspect, the invention relates to a system for populating tax forms. The system includes a computer processor, a repository including a set of employer identification numbers (EINs), and a tax engine executing on the computer processor and configured to: receive, from a tax preparation application, a first request for tax data of a first user, wherein the first request includes a first name of a first employer; match the first name of the first employer to a first EIN of the set of EINs, wherein the first EIN corresponds to a first government agency; identify a first payroll provider of the first employer based on the first EIN; import the tax data from the first payroll provider; and populate a first tax form of the first user with the tax data and the first EIN.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for populating a tax form. In general, embodiments of the invention aggregate a set of employer identification numbers (EINs) in a repository. Each EIN may be associated with one or more payroll providers. After aggregating the EINs, a request for tax data of a user is received. The request may include an employer name which is then matched to an EIN in the repository. A payroll provider is identified in the repository based on the EIN and a set of tax data is obtained from the payroll provider. The tax data is then used to populate the tax form.

Figure 1:
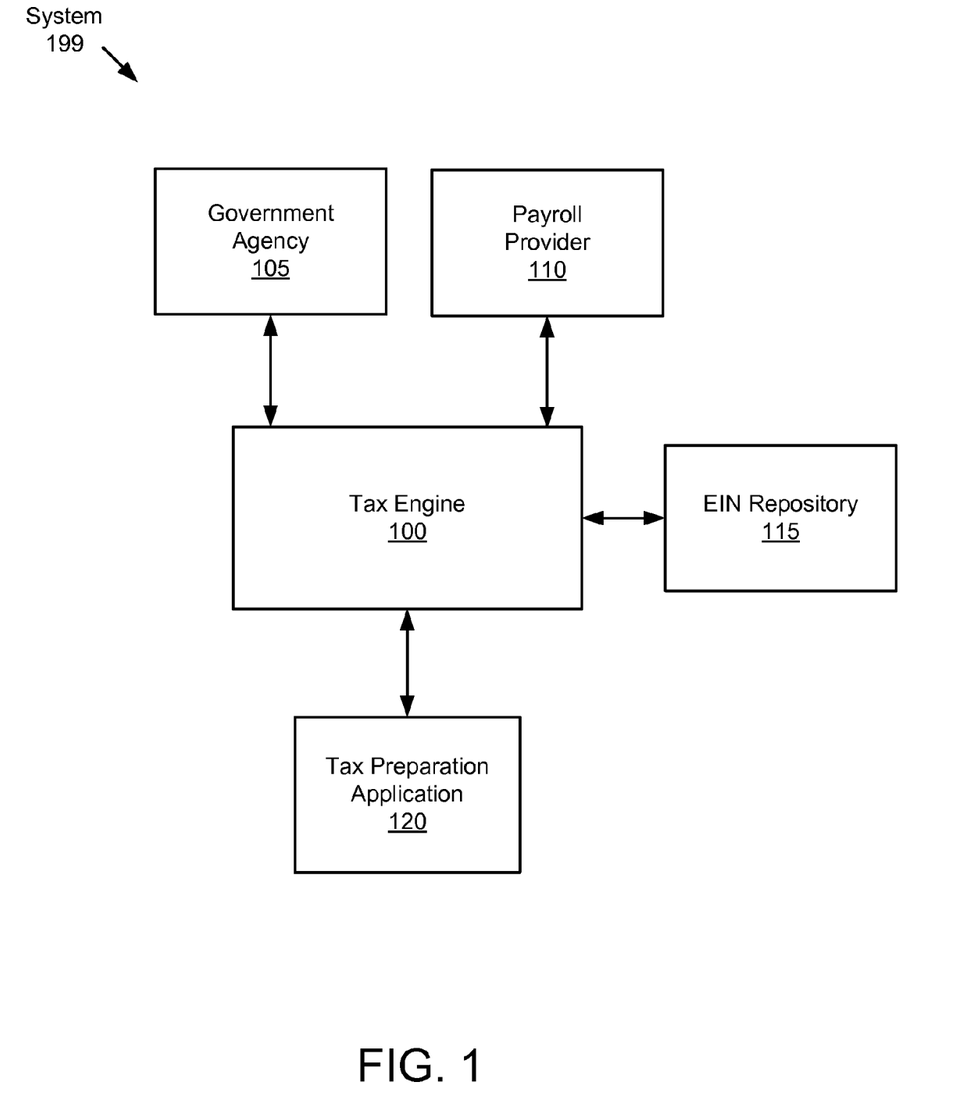
FIG. 1 shows a schematic diagram in accordance with one or more embodiments of the invention.

FIG. 1 shows a system (199) in accordance with one embodiment of the invention. As shown in FIG. 1, the system has multiple components including a tax engine (100), EIN repository (115), tax preparation application (120), government agency (105), and a payroll provider. The components of the system may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the tax engine (100) is a software application or a set of software applications executing on one or more hardware processors. The software application may be a web application in a server of a data center and/or a cloud computing application in a network distributed system. Alternatively, the tax engine (100) may be a software application residing in a personal computing device (e.g., smartphone, laptop computer, desktop computer, etc.) of a user. In one or more embodiments of the invention, the tax engine (100) is integrated within or operatively connected to the tax preparation application (120), a personal information manager, a financial management application (FMA), or other type of application.

In one or more embodiments of the invention, the tax engine (100) includes functionality to obtain employer identification numbers (EINs). The tax engine (100) may receive the EINs from any number of sources, in accordance with various embodiments of the invention. For example, the tax engine (100) may download EINs from one or more government agencies (e.g., government agency (105)). The government agency may be any agency providing data to or obtaining data from a tax paying entity. Examples of a government agency may include, but are not limited to, a city government, a sales and use tax agency, the Internal Revenue Service (IRS), a county tax assessor, a state franchise tax board, the social security office, a social services agency, the department of housing and urban development and/or any number of agencies.

In one or more embodiments of the invention, the tax engine (100) includes functionality to obtain one or more EINs directly from an employer. An employer may upload the EIN and/or other tax related data in order to provide automated processing for tax filers (e.g., employees of the employer). Thus, the employer may refer one or more employees for which tax data is available to the tax engine (100) for data import of data for a financial return. Alternatively, in one or more embodiments of the invention, the tax engine (100) obtains an EIN in conjunction with a tax filing of an employee. Thus, the tax engine (100) may obtain the EIN and/or EIN related data from the tax preparation application (120) or another tax related application.

In one or more embodiments of the invention, the EIN repository (115) is a database or storage application residing on one or more servers. For example, the EIN repository (115) may be a distributed database management system (DBMS) (or a component thereof), a clustered database, a standalone flat file, and/or any storage software residing on one or more physical storage devices. Examples of a storage device may include, but are not limited to, a hard disk drive, a tape drive, a redundant array of independent disks (RAID), and/or a solid state drive or memory device. Any type of database or storage application can be used, in accordance with various embodiments of the invention.

In one or more embodiments of the invention, the tax engine (100) includes functionality to aggregate a set of EINs in the EIN repository (115). The tax engine (100) may create an employer record for each employer or entity having an at least one EIN. The employer record may include a name, address, phone number, entity type (e.g., corporation, non-profit, individual, sole proprietor, etc.), number of employees, past tax documents, references to one or more past/current employee records, payroll provider(s), an effective date, a threshold for identifying a name, address, or phone number change, and/or any tax related data of the employer.

An EIN is a unique identifier assigned to an employer or other entity. The employer may be a corporation, partnership, individual and/or any other entity having a unique identifier provided by a government agency (regardless of actual tax liability). An employer may also be a tax exempt entity (e.g., a registered non-profit organization or a tax exempt individual) or an entity providing tax data to a tax paying entity (e.g., an entity providing an Internal Revenue Service (IRS) 1098 or 1099 form to a taxpayer).

Each EIN may correspond to one or more government agencies which use the EIN to uniquely identify the employer. Thus, for example, a government agency may assign an EIN to each employer for which it receives or provides data. Tax filers may then use the EIN to file one or more tax documents with the government agency. In one or more embodiments of the invention, a company may have multiple EINs, with each unique EIN corresponding to one or more government agencies.

In one or more embodiments of the invention, the tax engine (100) includes functionality to receive a request for tax data of a user. The request may be received from the from the tax preparation application (120) and may include a name of an employer and/or any other identifying information of the employer. Examples of identifying information of an employer may include, but are not limited to a name, an address, a ticker symbol, a phone number, a geographic region, a website uniform resource locator (URL), an email address, and/or any other information which may be used to identify the employer. In one or more embodiments of the invention, the request is for data required to populate a tax form and is received by the tax preparation application (120). The tax preparation application (120) may then send, to the tax engine (100), a request for tax data required in populating the tax form.

Examples of a tax form may include, but are not limited to, a deduction worksheet, an Internal Revenue Service (IRS) form 1040, an IRS form 2106, an IRS form 2555, a capital gains worksheet, a depreciation worksheet, a county tax assessor's property tax form, a state income tax reporting form, and/or any other tax related form. As such, the tax form may be a form which is filed with a financial return of a tax paying entity. Alternatively, the tax form may be a worksheet used to calculate one or more amounts entered into the financial return or any other tax related form, whether or not the form is filed with the financial return.

In one or more embodiments of the invention, the tax preparation application (120) is a software application or a set of software applications executing on one or more hardware processors. The software application may be a web application in a server of a data center and/or a cloud computing application in a network distributed system. Alternatively, the tax preparation application (120) may be a software application residing in a personal computing device (e.g., smartphone, laptop computer, desktop computer, etc.) of a user. In one or more embodiments of the invention, the tax preparation application (120) is integrated within or operatively connected to the tax engine (100), a personal information manager, a financial management application (FMA), or other type of application.

In one or more embodiments of the invention, the tax engine (100) includes functionality to match the name of the employer to an EIN in the EIN repository (115). In one or more embodiments of the invention, the tax engine (100) utilizes one or more matching criteria to determine if a match is made. The tax engine (100) may evaluate one or more matching criteria using identifying information of an employer and EIN data in the EIN repository as input to the matching criteria. If a matching criteria is satisfied, the tax engine (100) determines that a match is made. If the matching criteria is not satisfied, a match is not made. Examples of a matching criteria may include, but are not limited to, a requirement that at least 90% (or any predefined percentage) of the characters in the employer name provided by the request match an employer name in the EIN repository (115), a requirement that at least 3 fields of an employer record in the EIN repository (115) are identified by the request, and a requirement that a challenge question is answered correctly. Any other criteria for matching user-provided data to an EIN or employer record may be used in accordance with various embodiments of the invention.

In one or more embodiments of the invention, the tax engine (100) includes functionality to add a new employer record to the EIN repository (115) if a match is not made. The employer record may include identifying information of the employer from the request and/or one or more other sources identified by the tax engine (100). The tax engine (100) may be configured to obtain additional identifying information of the employer from a government agency (105), a repository of publicly available information (e.g., an Internet search), and/or any source.

In one or more embodiments of the invention, the tax engine (100) includes functionality to identify, based on the EIN, a payroll provider (e.g., payroll provider (110)) of the employer in the EIN repository (115). The payroll provider may be a software application or a set of related software applications of the employer or a separate organization or entity hired to perform payroll processing for the employer. The tax entity may identify the payroll provider by identifying an employee record in the EIN repository (115) based on one or more matching criteria being satisfied. The employee record may include a reference to the payroll provider and/or any other identifying information of the payroll provider (e.g., name, address, phone number, website URL, authenticating credentials to be used in obtaining taxdata, etc.).

In one or more embodiments of the invention, the tax engine (100) includes functionality to import tax data from the payroll provider (110). The tax data may be specific data requested by the tax engine (100) or may be data relevant to a tax paying entity identified by the tax engine (100). The tax engine (100) may establish a secure connection with a software application of the payroll provider (110) using one or more credentials and may import the tax data using any means of file transfer, in accordance with various embodiments of the invention. The credentials may be obtained from the tax paying entity or may be pre-established between the tax engine (100) and the software application.

In one or more embodiments of the invention, the tax engine (100) includes functionality to display the tax data to the user (e.g., tax paying entity). The tax engine (100) may include a user interface (not shown) configured to display the tax data. The user interface may accept one or more credentials of the user corresponding to a user account. Upon obtaining the credentials, the tax engine (100) show a summary page of all data available (or obtained) from the payroll provider (110). The summary page may display titles of one or more tax forms for which tax data is available (or imported). In one or more embodiments of the invention, the tax preparation application (120) includes the user interface and displays the summary page to the user.

In one or more embodiments of the invention, the tax engine (100) includes functionality to receive a confirmation of the tax data from the user. The tax engine (100) may display tax data available from the payroll provider in a user interface (e.g., a summary page). The user interface may prompt the user to select which data to import or to confirm an import of all available data. For example, the tax engine (100) may display groups of data corresponding to one or more tax forms on a summary page. In one or more embodiments of the invention, the tax engine (100) includes functionality to identify duplicate or overlapping data among the tax data. Duplicate and overlapping data may be data which has already been entered into a financial return by the tax paying entity. The tax engine (100) may display an indication on the summary page that overlapping data may cause an overwrite of user-entered data on the financial return.

In one or more embodiments of the invention, the tax engine (100) includes functionality to populate the tax form of the user with tax data. The tax data may include an EIN and/or other data obtained from the payroll provider (110). The tax data may be used to calculate one or more financial amounts (e.g., adjusted gross income) to be entered on a financial return of a tax paying entity. The tax data may also include one or more amounts entered directly into the financial return or a worksheet corresponding to the financial return. The tax engine (100) may overwrite existing data in the financial return or may decline to populate one or more fields based on a selection of the user.

In one or more embodiments of the invention, the tax engine (100) includes functionality to receive multiple requests to populate tax forms. Each request may include a name of an employer. Requests may be received from any number of tax preparation applications, tax paying entities, and/or representatives of tax paying entities (e.g., an certified public accountant) over any time period.

In one or more embodiments of the invention, the tax engine (100) includes functionality to determine, based on multiple requests to populate tax forms, that a threshold for identifying a name change is exceeded. A threshold may be any condition for updating a field in an employee record within the EIN repository (115). For example, the threshold may require that a predefined number of requests within a predefined time period spell an employer name differently than a corresponding employer record in the EIN repository (115). In this example, the requests must be matched to the same employer record and the predefined number of requests must spell the employer name identically. In another example, if at least 10 requests which are matched to the same employer record are received within a one day period, where each request spells the employer's name differently than the employer record (and the spelling of the name in the requests is identical), the threshold is satisfied. In this example, the requests may be matched to the employer record based on one or more matching criteria. The tax engine (100) may further be configured to replace the employer name in the employer record with the name identified in the requests upon determining that the threshold is satisfied.

In one or more embodiments of the invention, any number of thresholds may exist for any number of fields in an employer record. For example, a threshold may exist for an address field. In this example, the threshold requires that at least 5 requests be received designating a new address for the employer. Upon receiving the requests, the tax engine (100) may determine that the threshold is satisfied and the address in the employer record may be replaced by the new address.

In one or more embodiments of the invention, the tax engine (100) includes functionality to associate, in a repository, an EIN with an updated name. Associating the EIN with the updated name may include simply replacing and existing name in an employer record with the updated name. Alternatively, the updated name may be added to the employer record without removing the existing name until the threshold is satisfied.

In one or more embodiments of the invention, the tax engine (100) includes functionality to link two or more EINs in the EIN repository to a single employer record. Thus, for example, a single employer may have different state and federal EINs. In this example, the EIN repository (115) includes the federal EIN of the employer in a first employer record. The tax engine (100) then identifies the employer on a tax form of a user, using a set of matching criteria. The tax form includes the federal EIN not existing in the EIN repository. Based on the matching criteria being satisfied, the tax engine (100) adds the state EIN of the employer to the employer record.

In one or more embodiments of the invention, the tax engine (100) includes functionality to combine two or more employer records in the EIN repository (115) based on one or more matching criteria being satisfied. For example, the tax engine (100) may evaluate the matching criteria in order to determine whether one or more fields of the two records are identical or substantially similar (i.e., differ by fewer than N characters). Upon determining that the relevant matching criteria are satisfied, the tax engine (100) may create a master employer record including one or more merged fields common to both original employer records as well as fields existing only in one of the original records.

In one or more embodiments of the invention, the tax engine (100) includes functionality to receive a request to perform an employment verification. The tax engine (100) may receive the request from a web application or a client. The employment verification request may include one or more identifiers of an employer and one or more identifiers of the user such as, for example, social security number, name, and/or address. The tax engine (100) may match the employer identifiers (e.g., employer name) to an employer record and/or may identify a payroll provider (110) of the employer in the EIN repository (115). The tax engine (100) may be configured to send a request to the payroll provider to confirm employment of the user with the employer. The tax engine (100) may receive a response confirming that the user is employed with the employer or a response denying the employment relationship. If a confirmation is received from the payroll provider (110), the tax engine (100) may send a message to the client or the requesting entity indicating that the employment verification request is confirmed.

In one or more embodiments of the invention, the tax engine (100) includes functionality to receive a request to perform identity verification. The tax engine (100) may receive the request from a client and may send a challenge question to the client in response to the request. The identity verification request may include one or more identifiers of the user such as, for example, social security number, name, and/or address. The challenge question may request input of an EIN or identifying information of an employer of the user in order to verify an identity of a user. A response from the user containing the EIN and/or identifying information may be obtained by the client and sent to the tax engine (100). The tax engine (100) may be configured to identify an EIN corresponding to an employer of the user in the EIN repository (115) based on one or more identifiers of the user. If the EIN obtained from the client matches the EIN identified in the EIN repository (115), the tax engine (100) may determine that the identity of the user is verified and may send a verification message to the client. If the EIN obtained from the client does not match the EIN identified in the EIN repository (115), the tax engine (100) may determine that the identity of the user is not verified and may send a denial message to the client.

In one or more embodiments of the invention, the tax engine (100) includes functionality to identify an employer of a user using a social networking website. The tax engine (100) may be configured to obtain credentials of the user for the social networking website and to search a profile of the user on the social networking website for an employer. The tax engine (100) may identify an employment relationship on the profile or any other indication that the user is employed by the employer. In response to identifying the employer on the site, the tax engine (100) may match the employer to an employer record, create a new employer record, and/or identify a payroll provider (e.g., payroll provider (110)) from which to import data.

Figure 2:
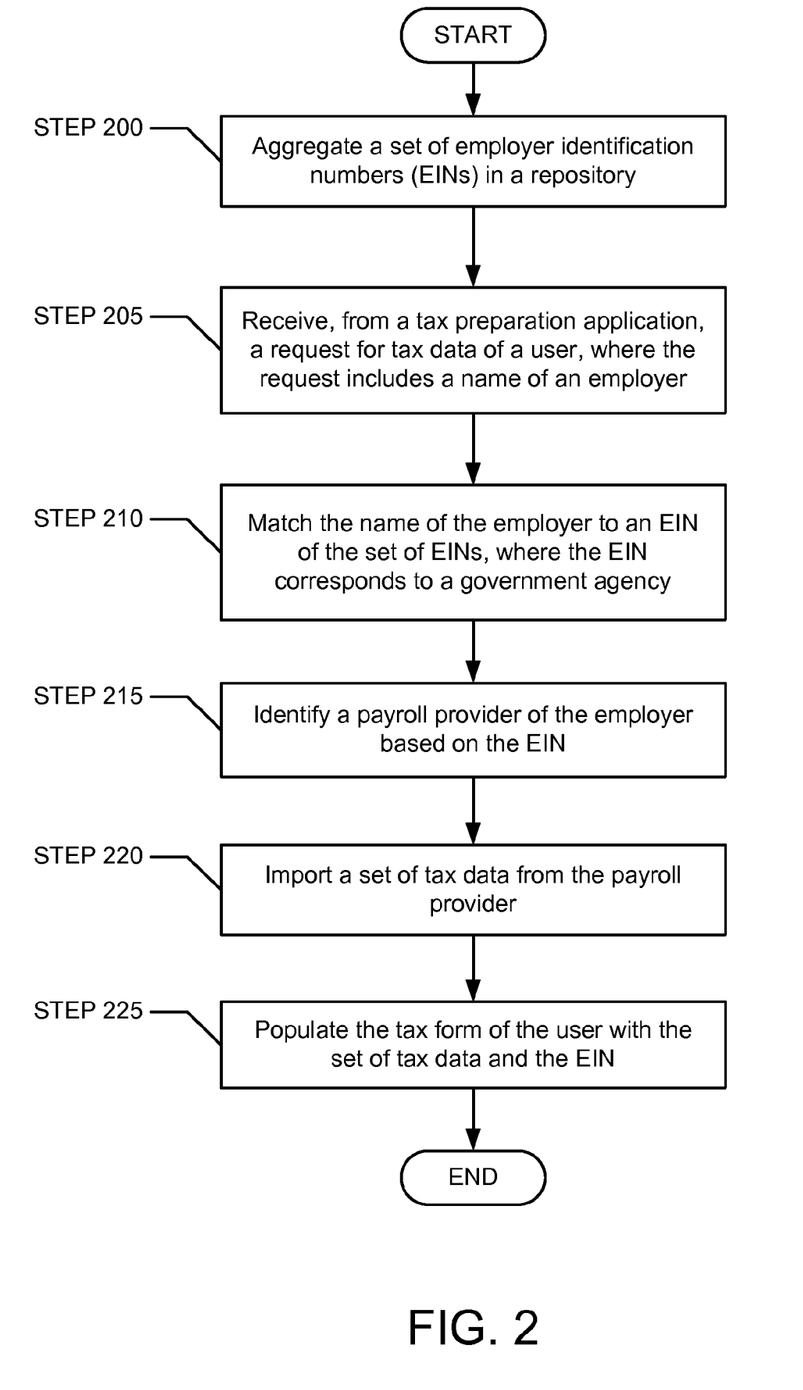
FIGS. 2 and 3 show flowcharts in accordance with one or more embodiments of the invention.

FIG. 2 shows a flowchart of a method for populating a tax form. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 2 should not be construed as limiting the scope of the invention.

In STEP 200, a set of employer identification numbers (EINs) are aggregated in a repository (e.g., EIN repository (115) of FIG. 1, discussed above). The EINs may correspond to any number of different employers and may be obtained at various different times from different sources (e.g., one or more government agencies, tax preparation applications, or tax paying entities). One employer record may be created in the repository for each unique EIN. Aggregating the EINs may include creating the employer records and importing data from the sources into the records.

In STEP 205, a request to populate a tax form of a user is received from a tax preparation application. The request may include a name of an employer and/or other identifying information of the employer. The request may also include identifying information of the user and/or one or more tax forms identified by the tax preparation application. Thus, the request may for specific tax data as required by a user for a financial return or may be a general request for all available data pertaining to the user.

In STEP 210, the name of the employer is matched to an EIN in the repository. The EIN corresponds to at least one government agency (i.e., at least one government agency uses the EIN to uniquely identify the employer). Any other user-provided data from the request may also be used to perform the match (as defined by one or more matching criteria), in accordance with various embodiments of the invention. The user-provided data may be matched to an employer record containing the EIN. In one or more embodiments of the invention, the matching criteria may be predefined by an administrator prior to receiving one or more requests.

In STEP 215, a payroll provider of the employer is identified based on the EIN. In one or more embodiments of the invention, the payroll provider is referenced by an employer record identified in STEP 210. STEP 215 may further include identifying a software application of the payroll provider, where the software application is configured to receive requests for tax data, employment verification, and/or identity verification. Thus, after identifying the payroll provider, a request for tax data may be sent to the payroll provider. The request may include identifying information of a user, authentication credentials, and/or requested types or categories of data.

In STEP 220, a set of tax data is imported from the payroll provider. The tax data may be imported using any method of file import/download, in accordance with various embodiments of the invention. Thus, the tax data may be pushed by the payroll provider and/or pulled from the payroll provider, in one or more embodiments of the invention.

In STEP 225, the tax form of the user is populated with the set of tax data and the EIN. The tax form may be populated in the same session in which the request was generated or may be stored until a subsequent session initiated by the user. In one or more embodiments of the invention, the user of the tax preparation application initiates a subsequent session and proceeds to confirm at least a subset of the tax data for import into the financial return or a form used in the preparation of the financial return. Upon completing preparation of the financial return, the financial return may be filed with the corresponding government agency.

Figure 3:
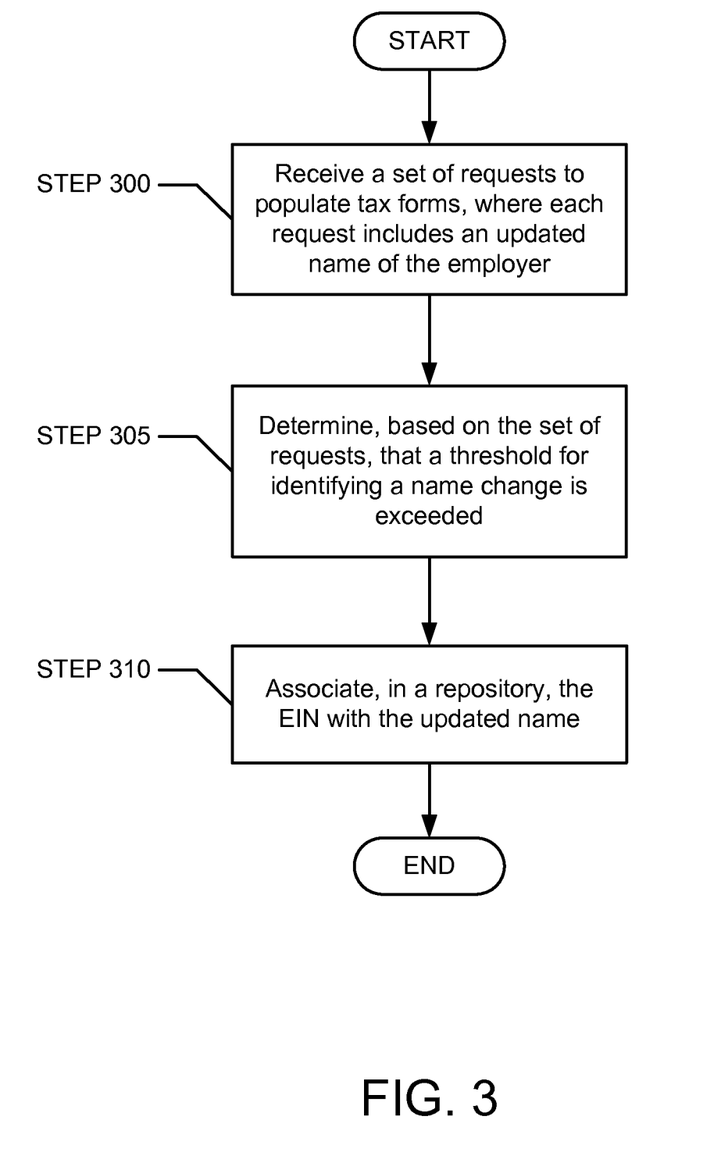

FIG. 3 shows a flowchart of a method for populating a tax form. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 3 should not be construed as limiting the scope of the invention.

In STEP 300, a set of requests to populate tax forms is received. Each request includes an updated name of an employer in an EIN repository (e.g., EIN repository (115) of FIG. 1, discussed above). The requests may originate from any number of sources (e.g., client machines) and may be received over any period of time, in accordance with various embodiments of the invention.

In STEP 305, it is determined, based on the set of requests, that a threshold for identifying a name change is exceeded. The threshold may be evaluated using data from the requests. In one or more embodiments of the invention, the threshold is deemed to be satisfied if a result of the evaluation is TRUE. Conversely, the threshold is deemed to not be satisfied if the result of the evaluation is FALSE. The threshold may be any criteria for determining if identifying information of an employer has changed. If the threshold is satisfied, one or more fields of an employer record in a repository may be updated with data from the requests of STEP 300.

In STEP 310, in response to the threshold being exceeded, the updated name is associated with the EIN in the repository. The name may be modified to a common name identified by the requests received in STEP 300, or the most commonly occurring variation of the name among the requests, in one or more embodiments of the invention. Any other employer data in the repository may be updated in a similar fashion if one or more thresholds are satisfied.

The following section describes various examples of the invention. The examples are included to aid in the understanding of the invention but are not intended to limit the scope of the invention.

Figure 4A:
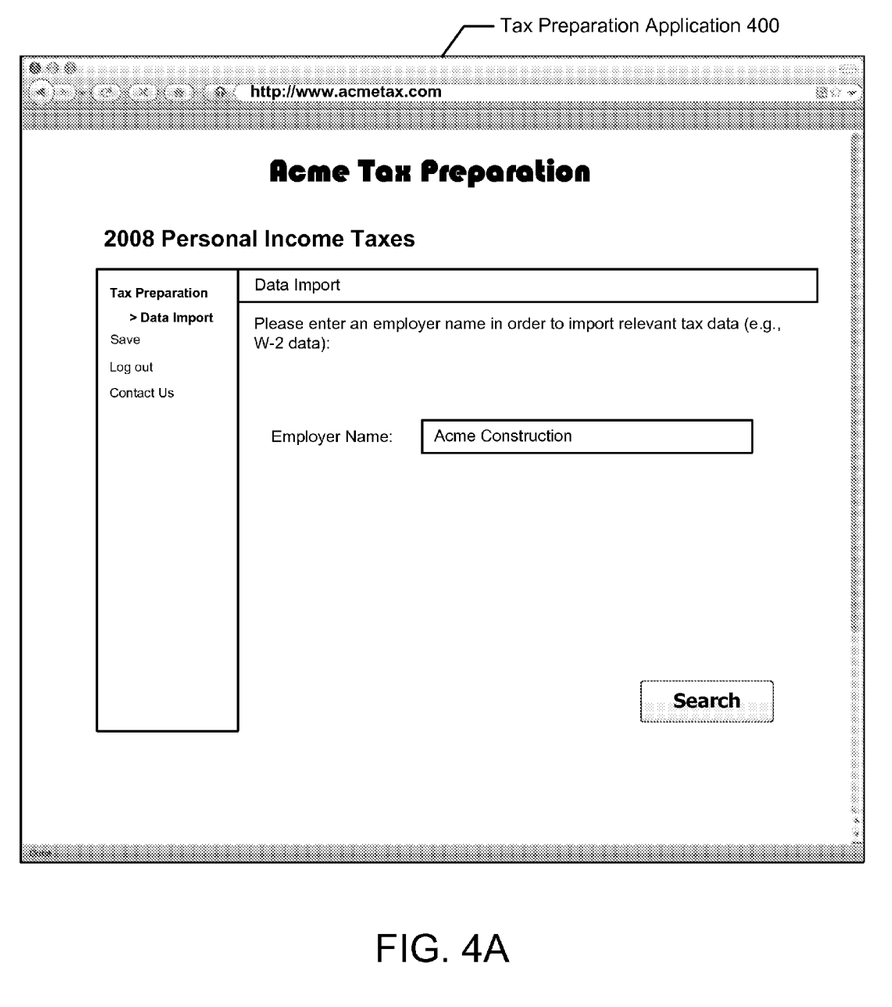
FIGS. 4A, 4B, and 4C show screenshots of a tax preparation application in accordance with one or more embodiments of the invention.

FIG. 4A depicts an example screenshot of a tax preparation application (e.g., tax preparation application (120) of FIG. 1, discussed above) in accordance with one or more embodiments of the invention. In this example, a user logs into a tax preparation application (400) in order to initiate a financial return. The user ("Paul Schmidt") enters an employer name ("Acme Construction Services") and address into a user interface in response to a request for employer information.

In this example, the tax preparation application (400) is operatively connected to a tax engine server application. The tax preparation application forwards the name of the employer along with the user's name and social security number to the tax engine in a request for tax data of the user. The tax engine then evaluates a matching criterion using the user-provided data. The matching criterion requires that the user-provided employer name have at least 80% of characters in common with an employer name in the repository. The tax engine identifies an employer record in the repository corresponding to "Acme Construction Services, Inc." The tax engine calculates that the user-provided employer name ("Acme Construction Services") has 26 out of 32 characters in common with the name identified in the repository. Thus, the tax engine calculates that the 81.25% of the characters are in common between the names.

Continuing the example, the matching criterion also requires that a user-provided address of the employer match the address stored in the employer record. Upon determining that the addresses match, the tax engine determines that the matching criterion is satisfied. The tax engine then identifies "Fast Payroll Services" as a payroll provider listed in the employer record. The employer record also includes an address of a server application and credentials required to obtain tax data from the payroll provider.

Figure 4B:
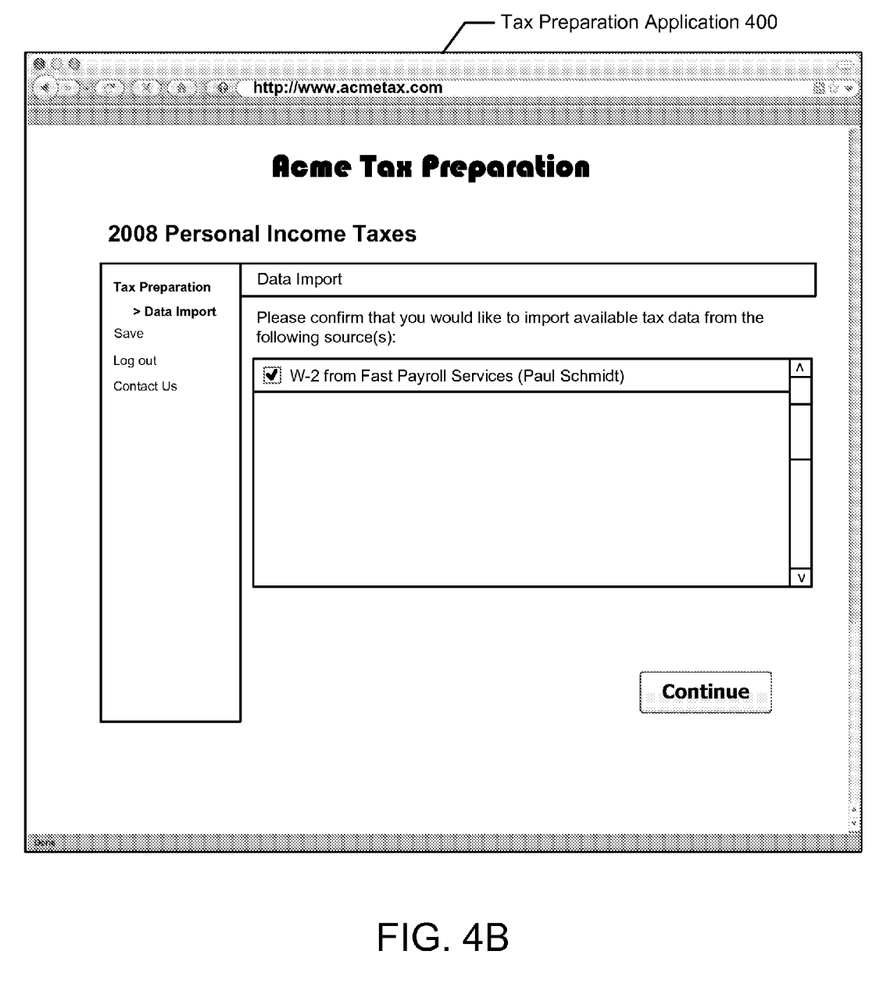

Continuing the example, the tax engine notifies of the identified payroll provider and requests confirmation from the user. The tax preparation application (400) then notifies the user that a payroll provider has been identified and asks whether the user would like to import available tax data from the payroll provider. FIG. 4B depicts a screenshot of the tax preparation application (400) at this point in the example.

Continuing the example, user Paul Schmidt selects the "Continue" button in order to request to download available tax data. The tax engine then queries the server application of the payroll provider, using the credentials, in order to determine what, if any, tax data is available for Paul Schmidt The tax engine determines that a W-2 for the 2008 tax year is available and sends a message to the tax preparation application (400) requesting confirmation from the user.

Figure 4C:
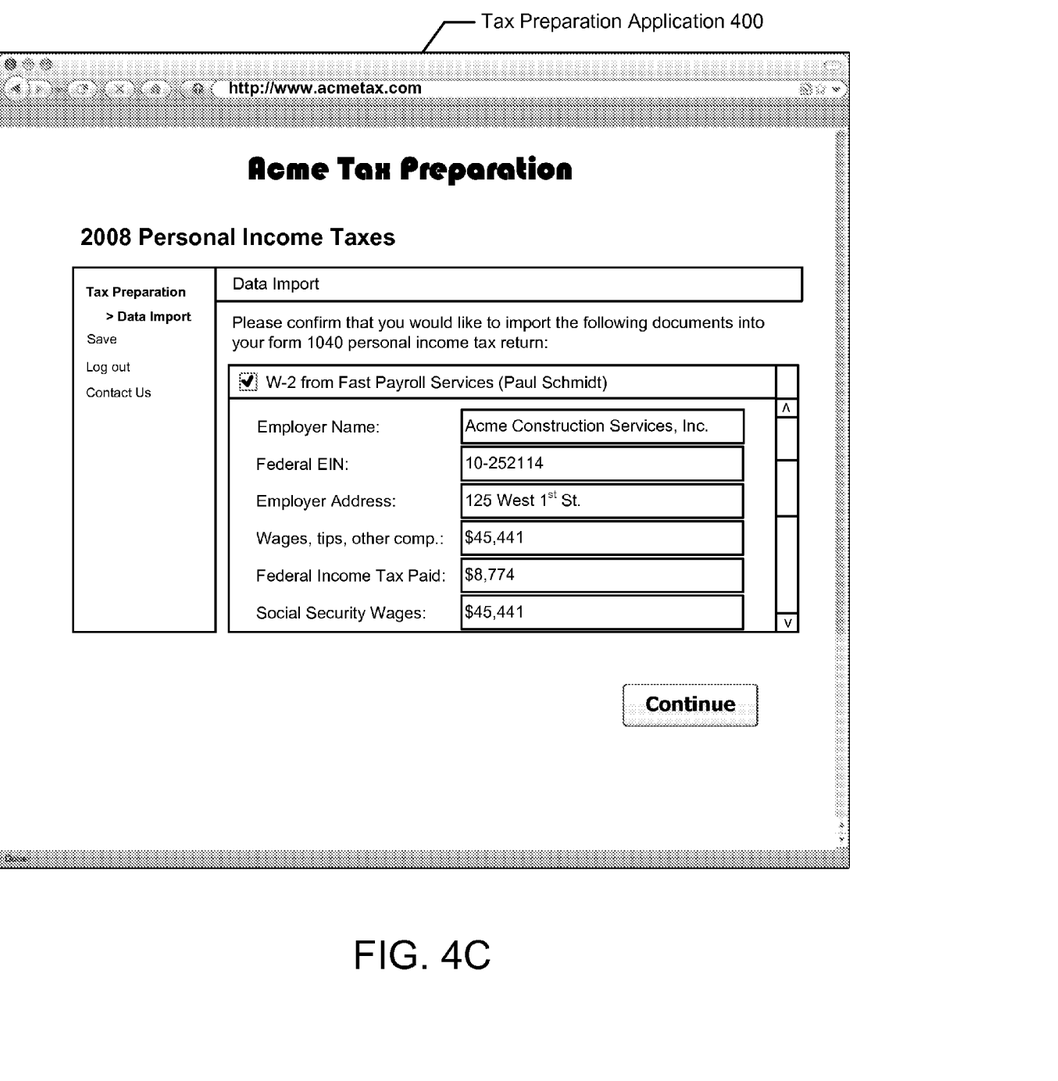

Continuing the example, the tax preparation application (400) displays a summary page to the user depicting the available tax data. FIG. 4C depicts an example screenshot of the summary page. User Paul Schmidt selects to import the available W-2 data and the tax engine imports the requested data. The tax preparation application (400) then completes Paul Schmidt's 2008 financial return and files the return with the appropriate government agency.

Figure 5:
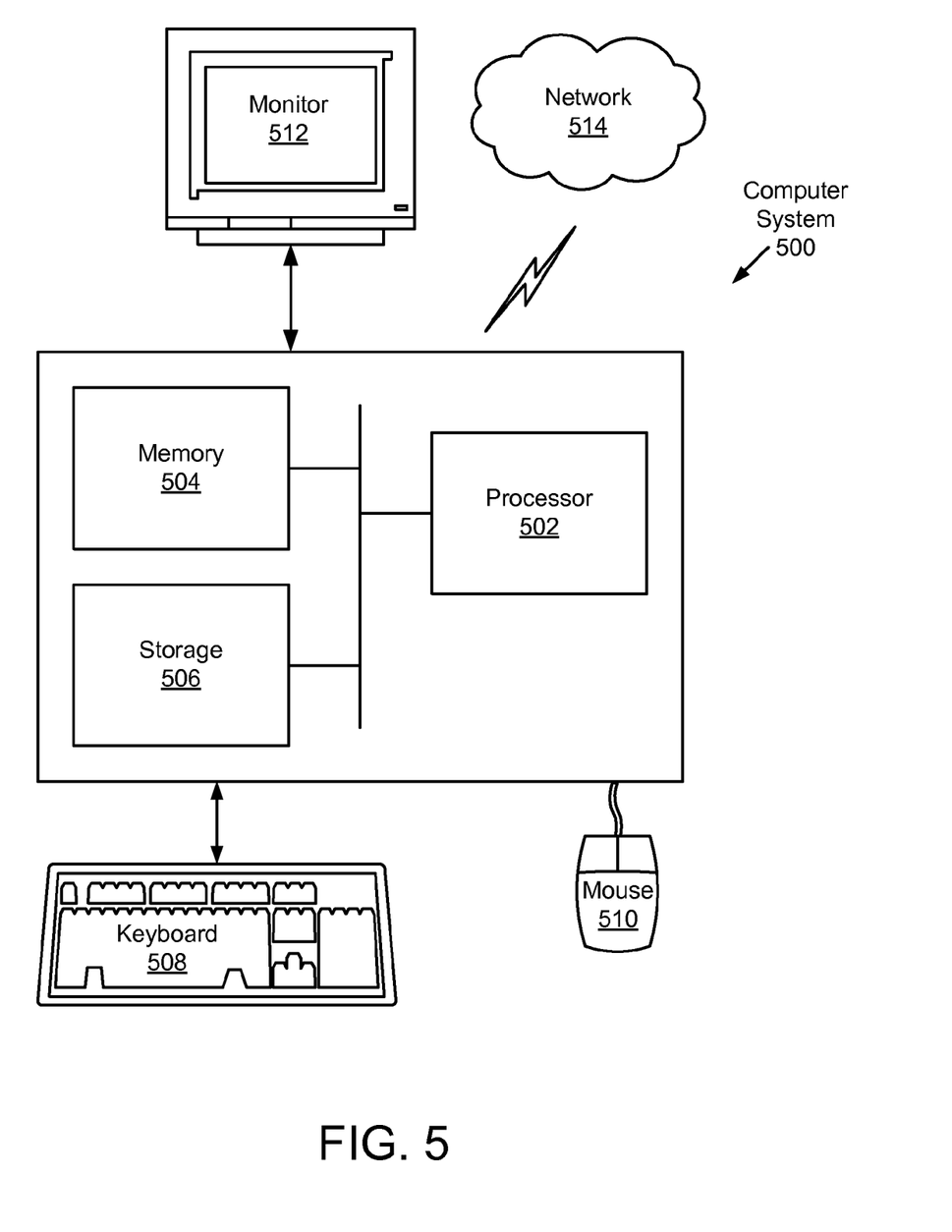
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502) (such as a central processing unit (CPU), integrated circuit, hardware processor, etc.), associated memory (504) (e.g., RAM, cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention (e.g., tax engine (100), EIN repository (115), tax preparation application (120), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By storing multiple employer identification numbers (EINs) and information identifying one or more corresponding payroll providers in a repository, it may be possible to reduce the amount of data entry from a user in preparing a tax preparation application.

By aggregating multiple EINs in a repository and by updating employer information corresponding to the EINs in response to one or more thresholds being satisfied, it may be possible to keep the information current with reduced human data entry.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for populating tax forms, comprising:
accessing a repository comprising a plurality of employer records, wherein the plurality of employer records comprises a plurality of employer names and a plurality of employer identification numbers (EINs);
receiving, from a tax preparation application, a first request for a first EIN for a first employer and for a plurality of tax data of a first user, wherein the first request comprises an employer name of the first employer and excludes the first EIN;
matching, by a computer processor, the employer name to a first employer record of the plurality of employer records;
identifying the first EIN for the first employer and a first payroll provider of the first employer from the first employer record, wherein the first EIN corresponds to a first government agency, and wherein the first EIN is unknown to the tax preparation application prior to matching the employer name to the first employer record;
accessing the first payroll provider identified from the first employer record;
importing, by the computer processor, the plurality of tax data from the first payroll provider using the first EIN;
populating a first tax form of the first user with the plurality of tax data and the first EIN;
receiving a second tax form of the first user comprising the employer name;
identifying a second EIN of the first employer on the second tax form of the first user, wherein the second EIN corresponds to a second government agency; and
linking the second EIN with the first EIN in the repository.

2. The method of claim 1, further comprising:
receiving a plurality of requests for tax data, wherein each of the plurality of requests comprises an updated name of the first employer;
determining, based on the plurality of requests, that a threshold for identifying a name change is exceeded; and
associating, in the repository, the first EIN with the updated name.

3. The method of claim 1, further comprising:
displaying the plurality of tax data to the first user; and
receiving a confirmation of the plurality of tax data from the first user, wherein populating the first tax form of the first user is in response to receiving the confirmation.

4. The method of claim 1, further comprising:
importing the plurality of EINs from the first government agency prior to receiving the first request.

5. The method of claim 1, further comprising:
extracting the plurality of EINs from a plurality of previously filed tax returns prior to accessing the repository.

6. The method of claim 1, further comprising:
receiving, from a client, an employment verification request to confirm employment of a second user, wherein the employment verification request comprises a name of a second employer;
matching the name of the second employer to a third EIN of the plurality of EINs;
identifying, in the repository, a second payroll provider of the second employer based on the third EIN;
sending, to the second payroll provider, a second request to confirm employment of the second user;
receiving, in response to the second request, a confirmation that the second user is employed by the second employer; and
confirming, to the client, that the second user is employed by the second employer.

7. The method of claim 6, further comprising:
identifying a profile of the second user on a social networking website; and
identifying the name of the second employer on the profile, wherein confirming that the second user is employed by the second employer is based on identifying the name on the profile.

8. The method of claim 1, further comprising:
receiving a second request for a different plurality of tax data of a second user, wherein the second request comprises an address of a second employer;
matching the address of the second employer to a third EIN of the plurality of EINs;
identifying a name associated with the third EIN;
identifying a second payroll provider of the second employer based on the third EIN;
importing the different plurality of tax data from the second payroll provider; and
populating a third tax form of the second user with the different plurality of tax data, the third EIN, and the name.

9. The method of claim 1, further comprising:
receiving, from a client, an identity verification request;
sending a challenge question to the client in response to the identity verification request, wherein the challenge question requests a third EIN;
receiving, in response to the challenge question, the third EIN from the client;
identifying the third EIN within the plurality of EINs;
identifying, in the repository, a second payroll provider of a second employer corresponding to the third EIN;
sending, to the second payroll provider, a second request to confirm employment of a second user;
receiving a confirmation of employment in response to the second request; and
approving the identity verification request in response to the confirmation.

10. The method of claim 1, further comprising:
sending, to the first payroll provider, a second request comprising the first EIN and a social security number (SSN) of the first user, wherein the first payroll provider identifies the plurality of tax data based on the first EIN and the SSN.

11. The method of claim 1, further comprising:
filing, after populating the first tax form, the first tax form with the first government agency on behalf of the first user.

12. A non-transitory computer-readable storage medium storing a plurality of instructions for populating tax forms, the plurality of instructions comprising functionality to:
access a repository comprising a plurality of employer records, wherein the plurality of employer records comprises a plurality of employer names and a plurality of employer identification numbers (EINs);
receive, from a tax preparation application, a first request for a first EIN for a first employer and for a plurality of tax data of a first user, wherein the first request comprises an employer name of the first employer and excludes the first EIN;
match the employer name to a first employer record of the plurality of employer records;
identify the first EIN for the first employer and a first payroll provider of the first employer from the first employer record, wherein the first EIN corresponds to a first government agency, and wherein the first EIN is unknown to the tax preparation application prior to matching the employer name to the first employer record;
access the first payroll provider identified from the first employer record;
import the plurality of tax data from the first payroll provider using the first EIN;
populate a first tax form of the first user with the plurality of tax data and the first EIN;
receive a second tax form of the first user comprising the employer name;
identify a second EIN of the first employer on the second tax form of the first user, wherein the second EIN corresponds to a second government agency; and
link the second EIN with the first EIN in the repository.

13. The non-transitory computer-readable storage medium of claim 12, wherein the plurality of instructions further comprise functionality to:
receive a plurality of requests for tax data, wherein each of the plurality of requests comprises an updated name of the first employer;
determine, based on the plurality of requests, that a threshold for identifying a name change is exceeded; and
associate, in the repository, the first EIN with the updated name.

14. The non-transitory computer-readable storage medium of claim 12, wherein the plurality of instructions further comprise functionality to:
display the plurality of tax data to the first user; and
receive a confirmation of the plurality of tax data from the first user, wherein populating the first tax form of the first user is in response to receiving the confirmation.

15. The non-transitory computer-readable storage medium of claim 12, wherein the plurality of instructions further comprise functionality to:
import the plurality of EINs from the first government agency prior to receiving the first request.

16. The non-transitory computer-readable storage medium of claim 12, wherein the plurality of instructions further comprise functionality to:
extract the plurality of EINs from a plurality of previously filed tax returns prior to accessing the repository.

17. The non-transitory computer-readable storage medium of claim 12, wherein the plurality of instructions further comprise functionality to:
receive, from a client, an employment verification request to confirm employment of a second user, wherein the employment verification request comprises a name of a second employer;
match the name of the second employer to a third EIN of the plurality of EINs;
identify, in the repository, a second payroll provider of the second employer based on the third EIN;
send, to the second payroll provider, a second request to confirm employment of the second user;
receive, in response to the second request, a confirmation that the second user is employed by the second employer; and
confirm, to the client, that the second user is employed by the second employer.

18. The non-transitory computer-readable storage medium of claim 17, wherein the plurality of instructions further comprise functionality to: identify a profile of the second user on a social networking website; and
identify the name of the second employer on the profile, wherein confirming that the second user is employed by the second employer is based on identifying the name on the profile.

19. The non-transitory computer-readable storage medium of claim 12, wherein the plurality of instructions further comprise functionality to:
receive a second request for a different plurality of tax data of a second user, wherein the second request comprises an address of a second employer;
match the address of the second employer to a third EIN of the plurality of EINs;
identify a name associated with the third EIN;
identify a second payroll provider of the second employer based on the third EIN;
import the different plurality of tax data from the second payroll provider; and
populate a third tax form of the second user with the different plurality of tax data, the third EIN, and the name.

20. The non-transitory computer-readable storage medium of claim 12, wherein the plurality of instructions further comprise functionality to:
receive, from a client, an identity verification request;
send a challenge question to the client in response to the identity verification request, wherein the challenge question requests a third EIN;

receive, in response to the challenge question, the third EIN from the client;
identify the third EIN within the plurality of EINs;
identify, in the repository, a second payroll provider of a second employer corresponding to the third EIN;
send, to the second payroll provider, a second request to confirm employment of a second user;
receive a confirmation of employment in response to the second request; and
approve the identity verification request in response to the confirmation.

21. The non-transitory computer-readable storage medium of claim 12, wherein the plurality of instructions further comprise functionality to:
send, to the first payroll provider, a second request comprising the first EIN and a social security number (SSN) of the first user, wherein the first payroll provider identifies the plurality of tax data based on the first EIN and the SSN.

22. The non-transitory computer-readable storage medium of claim 12, wherein the plurality of instructions further comprise functionality to:
file, after populating the first tax form, the first tax form with the first government agency on behalf of the first user.

23. A system for populating tax forms, comprising:
a computer processor;
a repository storing a plurality of employer records comprising:
a plurality of employer names; and
a plurality of employer identification numbers (EINs);
a tax engine executing on the computer processor and configured to:
receive, from a tax preparation application, a first request for a first EIN for a first employer and for a plurality of tax data of a first user, wherein the first request comprises an employer name of the first employer and excludes the first EIN;
match the employer name to a first employer record of the plurality of employer records;
identify the first EIN for the first employer and a first payroll provider of the first employer from the first employer record, wherein the first EIN corresponds to a first government agency, and wherein the first EIN is unknown to the tax preparation application prior to the identifying;
access the first payroll provider identified from the first employer record;
import the plurality of tax data from the first payroll provider using the first EIN;
populate a first tax form of the first user with the plurality of tax data and the first EIN;
receive a second tax form of the first user comprising the employer name;
identify a second EIN of the first employer on the second tax form of the first user, wherein the second EIN corresponds to a second government agency; and
link the second EIN with the first EIN in the repository.

24. The system of claim 23, further comprising:
a tax preparation application configured to:
display the plurality of tax data to the first user; and
receive a confirmation of the plurality of tax data from the first user, wherein populating the first tax form of the first user is in response to receiving the confirmation.

25. The system of claim 24, wherein the tax preparation application is further configured to:
file, after populating the first tax form, the first tax form with the first government agency on behalf of the first user.

26. The system of claim 25, wherein the tax preparation application resides on a mobile device of the first user.

27. The system of claim 23, wherein the tax engine is further configured to:
receive a plurality of requests for tax data, wherein each of the plurality of requests comprises an updated name of the first employer;
determine, based on the plurality of requests, that a threshold for identifying a name change is exceeded; and
associate, in the repository, the first EIN with the updated name.

28. The system of claim 23, wherein the tax engine is further configured to:
import the plurality of EINs from the first government agency prior to receiving the first request.

29. The system of claim 23, wherein the tax engine is further configured to:
extract the plurality of EINs from a plurality of previously filed tax returns prior to accessing the repository.

30. The system of claim 23, wherein the tax engine is further configured to:
receive, from a client, an employment verification request to confirm employment of a second user, wherein the employment verification request comprises a name of a second employer;
match the name of the second employer to a third EIN of the plurality of EINs;
identify, in the repository, a second payroll provider of the second employer based on the third EIN;
send, to the second payroll provider, a second request to confirm employment of the second user;
receive, in response to the second request, a confirmation that the second user is employed by the second employer; and
confirm, to the client, that the second user is employed by the second employer.

31. The system of claim 30, wherein the tax engine is further configured to:
identify a profile of the second user on a social networking website; and
identify the name of the second employer on the profile, wherein confirming that the second user is employed by the second employer is based on identifying the name on the profile.

32. The system of claim 23, wherein the tax engine is further configured to:
receive a second request for a different plurality of tax data of a second user, wherein the second request comprises an address of a second employer;
match the address of the second employer to a third EIN of the plurality of EINs;
identify a name associated with the third EIN;
identify a second payroll provider of the second employer based on the third EIN;
import the different plurality of tax data from the second payroll provider; and
populate a third tax form of the second user with the different plurality of tax data, the third EIN, and the name.

33. The system of claim 23, wherein the tax engine is further configured to:
- receive, from a client, an identity verification request;
- send a challenge question to the client in response to the identity verification request, wherein the challenge question requests a third EIN;
- receive, in response to the challenge question, the third EIN from the client;
- identify the third EIN within the plurality of EINs;
- identify, in the repository, a payroll provider of a second employer corresponding to the third EIN;
- send, to the second payroll provider, a second request to confirm employment of a second user;
- receive a confirmation of employment in response to the second request; and
- approve the identity verification request in response to the confirmation.

34. The system of claim 23, wherein the tax engine is further configured to:
- send, to the first payroll provider, a second request comprising the first EIN and a social security number (SSN) of the first user, wherein the first payroll provider identifies the plurality of tax data based on the first EIN and the SSN.

* * * * *